United States Patent [19]

Yasuda

[11] Patent Number: 4,906,081
[45] Date of Patent: Mar. 6, 1990

[54] TRANSMISSIVE FILTER FOR CORRECTING ILLUMINANCE DISTRIBUTION

[75] Inventor: Yuji Yasuda, Tokyo, Japan
[73] Assignee: Ricoh Company, Ltd., Tokyo, Japan
[21] Appl. No.: 209,214
[22] Filed: Jun. 20, 1988
[30] Foreign Application Priority Data Jun. 19, 1987 [JP] Japan .................. 62-154623

[51] Int. Cl.$^4$ .............................. G02B 5/20
[52] U.S. Cl. .................. 350/439; 350/438; 350/448
[58] Field of Search ............... 350/448–450, 350/438, 439

[56]  References Cited
U.S. PATENT DOCUMENTS

| | | | |
|---|---|---|---|
| 3,669,528 | 6/1972 | Richardson | 350/448 |
| 3,728,009 | 4/1973 | Fedotowsky et al. | 350/448 X |
| 4,030,817 | 6/1977 | Westell | 350/448 X |
| 4,457,593 | 7/1984 | Yokota | 350/448 |

Primary Examiner—Scott J. Sugarmann
Attorney, Agent, or Firm—Oblon, Spivak, McClelland, Maier & Neustadt

[57] ABSTRACT

A transmissive filter for correcting illuminance distribution is positioned between a lens for forming an image of an illuminated original on an image forming surface and the image forming surface, or between the original and the image forming lens, and having transparent areas for passing light therethrough and opaque areas for blocking light, for correcting illuminance irregularities on the image forming surface. The transmissive filter has lowest transmittance around an effective pupil formed by projecting an exit pupil of the lens onto the filter when the filter is disposed between the lens and the image forming surface, or lowest transmittance around an effective pupil formed by projecting an entrance pupil of the lens onto the filter when the filter is disposed between the original and the lens. The transmittance is progressively higher concentrically in a stepwise manner toward an axial center and an outer periphery of the filter.

8 Claims, 10 Drawing Sheets

TRANSMISSIVE FILTER FOR CORRECTING ILLUMINANCE DISTRIBUTION

BACKGROUND OF THE INVENTION

1. Field of the Invention:

The present invention relates to a transmissive filter for correcting illuminance irregularities in an image forming area in an image forming optical system.

2. Description of the Prior Art:

It is known in image forming optical systems such as electrophotographic copying apparatus for copying original image films, facsimile transmitter/receivers, and the like that if an original image, an object, or the like is uniformly illuminated with light, the brightness on a surface on which an image of the illuminated object is formed is progressively lowered in a direction away from the optical axis resulting in illuminance irregularities (exposure irregularities) due to the cosine law.

It has been customary to correct such illuminance irregularities on the image forming surface by placing, between the image forming surface and a focusing lens for focusing an image on the image forming surface, or between the original image and the focusing lens, either a transmissive filter composed of a transparent base plate having thereon opaque dots which are closely spaced in a region near the optical axis and becomes progressively coarser toward the peripheral edge of the filter, or an area-type filter having an attenuating region near the optical axis.

These conventional filters have their transmittance progressively increased from the optical axis toward the peripheral edge. With this arrangement of known nature, however, the illuminance error developed upon illuminance correction is considerably large dependent on the height of the object, as shown in FIG. 31 of the accompanying drawings. Moreover, the prior filters are not sufficiently effective in eliminating illuminance unevenness which is caused by changes in the field angle of the focusing lens at the time of enlarging or reducing the size of the image.

SUMMARY OF THE INVENTION

Therefore, it is an object of the present invention to provide a transmissive filter for correcting illuminance distribution on an image forming surface with high accuracy irrespective of whether an image is formed in full size or varied size.

Another object of the present invention is to provide a transmissive filter which can be manufactured with high accuracy and at low cost, for correcting illuminance distribution on an image forming surface with high accuracy irrespective of whether an image is formed in full size or varied size.

According to the present invention, there is provided a transmissive filter for correcting illuminance distribution, adapted to be positioned between a lens for forming an image of an illuminated original on an image forming surface and the image forming surface, or between the original and the image forming lens, and having transparent areas for passing light therethrough and opaque areas for blocking light, for correcting illuminance irregularities on the image forming surface, the transmissive filter having lowest transmittance around an effective pupil formed by projecting an exit pupil of the lens onto the filter when the filter is disposed between the lens and the image forming surface, or lowest transmittance around an effective pupil formed by projecting an entrance pupil of the lens onto the filter when the filter is disposed between the original and the lens, the transmittance being progressively higher concentrically in a stepwise manner toward an axial center and an outer periphery of the filter.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
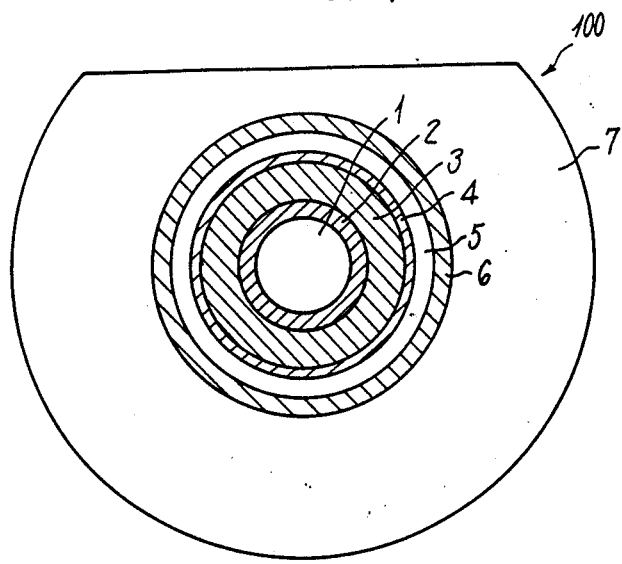
FIG. 1 is a schematic front elevational view of a transmissive filter for correcting illuminance distribution according to an embodiment of the present invention.
Figure 2:
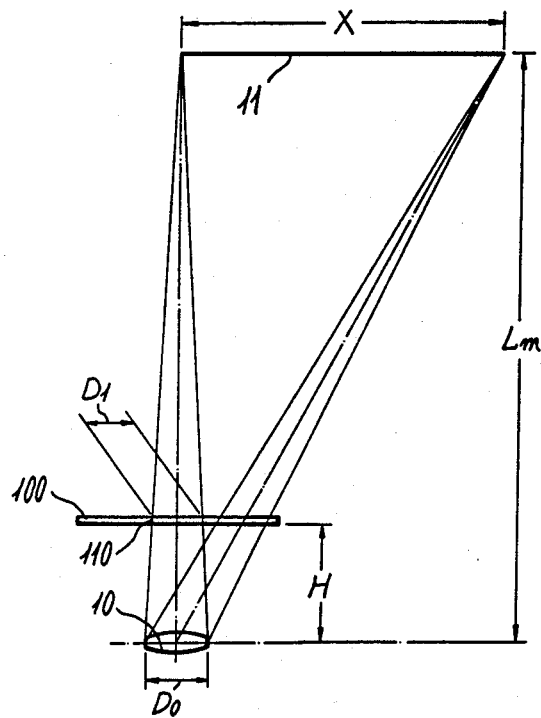
FIG. 2 is a diagram showing a position where the filter of FIG. 1 is disposed in an image forming optical system.
Figure 3:
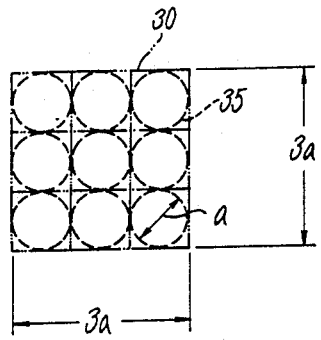
FIG. 3 is a view showing one square unit on the filter.

FIG. 1 schematically shows a transmissive filter for correcting illuminance distribution according to an embodiment of the present invention. As shown in FIG. 2, the transmissive filter, generally denoted at 100, is in the form of a thin plate and disposed between an original image or object 11 having a maximum height X and an image forming or focusing lens (not shown) with the distance H between the entrance pupil 10 of the lens and the filter 100 being 52 mm. A projected effective pupil 110 on the filter 100 of the entrance pupil 10 has a diameter $D_1$ of 25.6 mm. As shown in FIG. 1, the filter 100 comprises a circular transparent axially central portion 1 including the axis, an outermost peripheral portion 7, and a plurality of annular portions 2, 3, 4, 5, 6 divided concentrically between the axially central portion 1 and the outermost peripheral portion 7. Although the annular portions 2, 3, 4, 5, 6 are shown as hatched in FIG. 1 for simplicity, any of dot patterns shown in FIGS. 4 through 13 are actually formed on each of these annular portions by evaporation or etching for providing a desired degree of transmittance.

The transmittance is determined by the ratio of the area of opaque dots to the area of a transparent region. Since dots formed at random would produce highlights and shadows on the image forming surface, dots are formed according to certain patterns according to the present invention. More specifically, a plurality of square units 30 each having vertical and horizontal sides 3a indicated by imaginary lines are formed in each of the axially central portion 1, the annular portions 2, 3, 4, 5, 6, and the outermost peripheral portion 7, each of the units 30 containing opaque circles 35 indicated by the dotted lines and having a diameter a (63.5 $\mu$ in the illustrated embodiment). These opaque circles 35 may be arranged in selected patterns shown in FIGS. 5 through 13. Use of such patterns is effective to increase the accuracy and minimize the difference between highlights and shadows.

The transmittance is defined by (the area of a transparent region/the entire area)×100 (%). If the number of circles is indicated by n, then the transmittance is given by:

$$\frac{(1 - \pi \times (a/2)^2 \times n)}{(3a)^2} \times 100 \text{ (\%)} = \frac{\pi n}{36} \times 100 \text{ (\%)}$$

Figure 4:
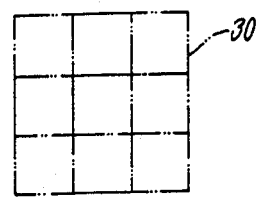
FIG. 4 is a view showing 100% transmittance in one unit.
Figure 5:
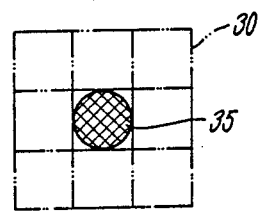
FIG. 5 is a view illustrating the unit with one dot formed thereon.
Figure 6:
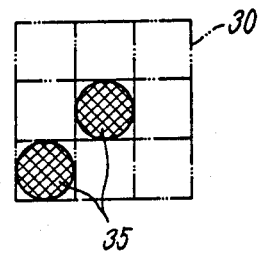
FIGS. 6 through 13 are views showing units with two, three, four, five, six, seven, eight, and nine dots formed respectively thereon.
Figure 7:
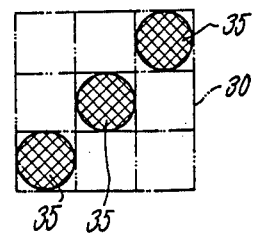
Figure 8:
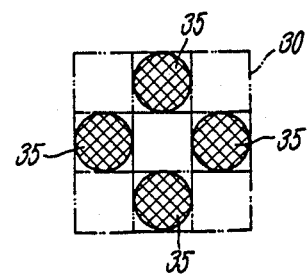
Figure 9:
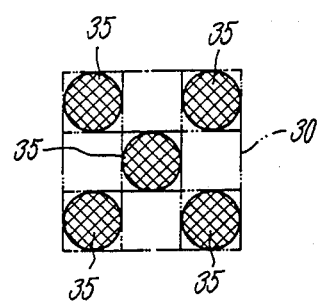
Figure 10:
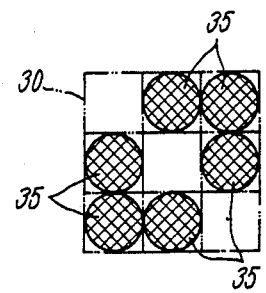
Figure 11:
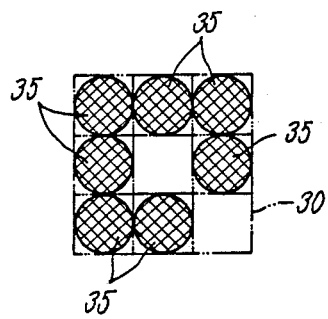
Figure 12:
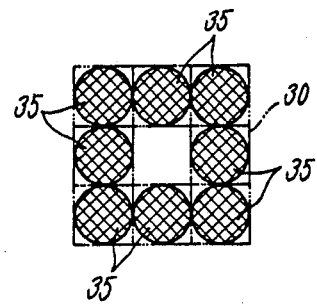
Figure 13:
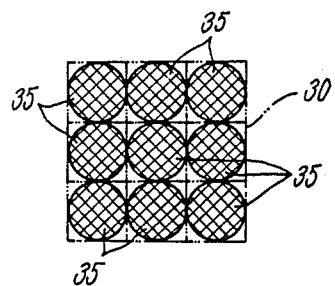

If there is no dot in the unit as shown in FIG. 4, then the transmittance is 100%. If there is one dot 35 at the center of the unit as shown in FIG. 5, then the transmittance is 91.2734%. If there are two dots as shown in FIG. 6, then the transmittance is 82.5467%. Three dots 35 in the unit as shown in FIG. 7 result in the transmittance of 73.8201%. With four dots 35 in the unit as shown in FIG. 8, the transmittance is 65.0934%. When there are five dots 35 in the unit as shown in FIG. 9, the transmittance is 56.3668%. When six dots 35 are contained in the unit as shown in FIG. 10, the transmittance is 47.6401%. The tranmittance is 38.9135%, 30.1868%, and 21.4602% if the unit contains seven dots, eight dots, and nine dots 35, respectively, as shown in FIGS. 11, 12, and 13. Therefore, the filter of the present invention can select one of ten transmittance levels. In this embodiment, filter radiuses and corresponding transmittances are determined in the following table:

| No. | Radius (mm) | Transmittance (%) |
|---|---|---|
| 1 | 7.85 | 100 |
| 2 | 9.75 | 30.1868 |
| 3 | 16.50 | 21.4602 |
| 4 | 18.20 | 38.9135 |
| 5 | 21.50 | 100 |
| 6 | 26.45 | 91.2734 |
| 7 |  | 100 |

The axially central portion 1, the annular portion 5, and the outermost peripheral portion 7 contain transparent units shown in FIG. 4. The annular portion 2 contains units having the dot pattern of FIG. 12. The annular portion 3 contains units having the dot pattern of FIG. 13. The annular portion 4 contains units having the dot pattern of FIG. 11. The annular portion 6 contains units having the dot pattern of FIG. 5. The transmissive filter 100 disposed between the original 11 and the image forming lens has a lowest transmittance level of 21.4602% around an effective pupil (having a diameter $D_1$ or a radius of 12.8 mm) projected from the entrance pupil 10 of the lens onto the filter 100. The transmittance of the filter 100 is progressively higher through concentric levels toward the axial center and the outer peripheral area thereof. While the dot positions are determined by each transmittance as described above in this embodiment, the dot positions may be different from the illustrated positions insofar as the number of dots in the square unit 30 remains unchanged.

Figure 14:
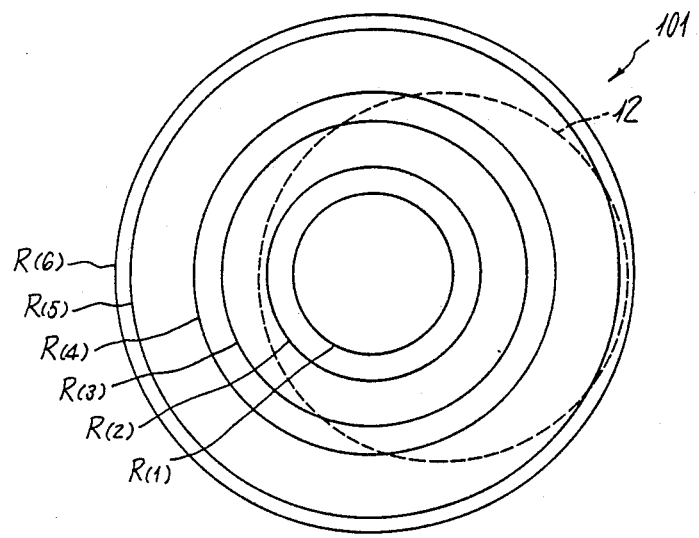
FIG. 14 is a view explaining the positional relationship between filter and a projected effective pupil on the filter.

The diameters and the transmittances of the annular portions 2, 3, 4, 5, 6 of the filter 100 are determined as follows: The transmittance of an annular portion within the effective pupil diameter $D_1$ on the optical axis of the filter 100 is determined as desired, and the radius of this annular portion is calculated. Then, the transmittances of the annular portions outside of the effective pupil diameter $D_1$ are determined successively outwardly from the center, and their radiuses are temporarily determined successively in the same manner as described above. The transmittances on the optical axis and in the positions displaced off the optical axis are calculated. For example, if a filter 101 composed of annular portions R(1), R(2), R(3), ... R(6) and an effective pupil 12 indicated by the dotted line are in the positional relationship as shown in FIG. 14, then the annular portions are classified according to positional relationship and a transmission ratio Q(I) for each positional relationship is determined. The annular portions can be classified into roughly three groups described below.

Figure 15:
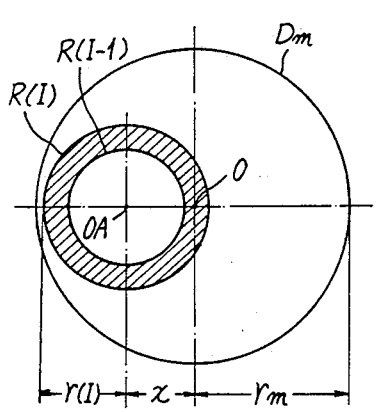
FIG. 15 is a diagram explaining a process of determining transmittance when the positional relationship is defined by $rm - x \geq r(I)$.

It is first assumed that the radius of the effective pupil Dm, the radius of the Ith concentric circle R(I), the Ith transmittance, and the Ith transmittance ratio are indicated respectively by rm, r(I), T(I), and Q(I). If the axial center O of the effective pupil Dm is spaced a distance x from the axial center OA of the filter as shown in FIG. 15, and the formula $rm - x \geq r(I)$ is met, then the Ith transmittance ratio Q(I) is given by the following equation;

$$Q(I) = [\pi r(I)^2 - S(I-1)] \times T(I)/\pi rm^2$$

where $S(I-1)$ is the area surrounded by the circle $R(I-1)$.

Figure 16:
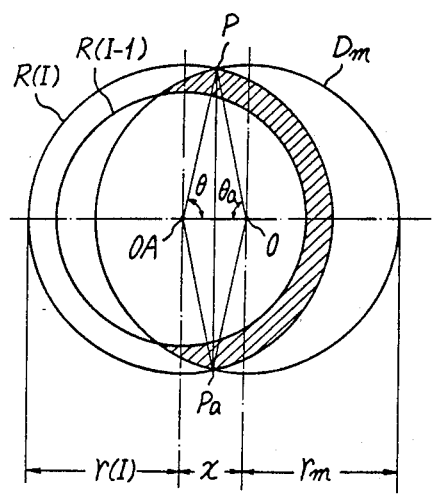
FIG. 16 is a diagram explaining a process of determining transmittance when the positional relationship is defined by $rm - x < r(I) < rm + x$.

The transmission ratio Q(I) in the case where $rm - x < r(I) < rm + x$ is met as shown in FIG. 16 is determined in the following manner: Assuming that the area surrounded by R(I−1) and Dm is S(I−1) and the distance x between the axial center O and the axial center OA is $\alpha$, the circle R(I) is expressed by:

$$x^2 + y^2 = r(I)^2$$

and the circle Dm is expressed by:

$$(x-\alpha)^2 + y^2 = rm^2.$$

Therefore, the X coordinate $\beta$ of points P, Pa of intersection between R(I), Dm is represented by:

$$\beta = (\alpha^2 + r(I)^2 - rm^2)/2\alpha.$$

Angles $\theta$, $\theta a$ formed between the x-axis and the intersection points P, Pa are given by:

$$\theta = \cos^{-1}[\beta/r(I)]$$

$$\theta a = \cos^{-1}[(\alpha-\beta)/rm].$$

Provided the areas of a sector OA-P-Pa and a sector O-P-Pa are indicated by S, Sa, respectively, these areas S, Sa are represented by:

$$S = \theta \times r(I)^2 - \beta \times r(I) \times \sin\theta$$

$$Sa = \theta a \times rm^2 - (\alpha-\beta) \times rm \times \sin\theta a.$$

Therefore, the transmission ratio Q(I) is expressed by:

$$Q(I) = [S + Sa - S(I-1)] \times T(I)/\pi rm^2.$$

Figure 17:
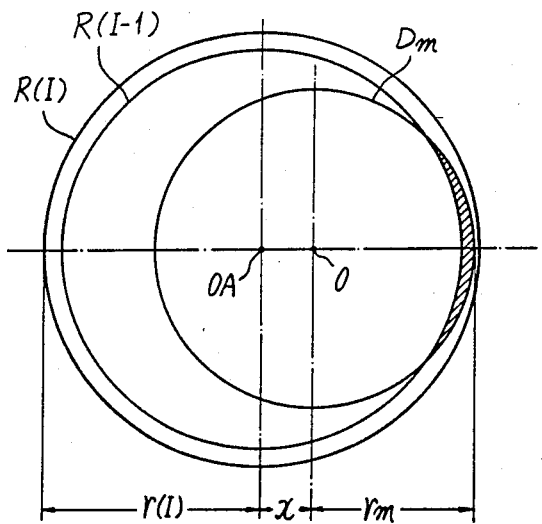
FIG. 17 is a diagram explaining a process of determining transmittance when the positional relationship is defined by $rm + x < r(I)$, $rm - x < r(I)$.

If $rm + x < r(I)$ and $rm - x < r(I)$ are met as shown in FIG. 17, then the transmission ratio Q(I) is given by:

$$Q(I) = [\pi rm^2 - S(I-1)] \times T(I)/\pi rm^2$$

were S(I−1) is the area surrounded by Dm and R(I−1).

By adding the transmittances Q(I) thus grouped, i.e., by effecting the calculation:

$$\sum_{I=1}^{n} Q(I)$$

when there are n concentric circles, the transmittance Tx in a desired position at the time of forming an image of full size can be found.

An illuminance error $\Delta x$ in a desired position x can be determined by:

$$\Delta x = [\{(x/Lm)^2 + 1\}^2 - Tmx/Tm_0] \times 100 \ (\%)$$

where m is the magnification, Tmx the transmittance of the filter when projecting a point spaced x from the optical axis, $Tm_0$ the transmittance of the filter on the optical axis, and Lm the distance between the original 11 and the entrance pupil 10. For a full-size image, $\Delta x$ can be found by putting the values where m=1.

Therefore, the error $\Delta x$ in any desired position can be determined by putting the transmittance $T_1x$ in the position x when forming full-size image and the transmittance on the optical axis:

$$T_{10} = \frac{1}{[(X\max/L_1)^2 + 1]^2}$$

when forming a full-size image, into the above equation. Xmax represents the maximum height of the object and $L_1$ the distance between the entrance pupil and the object.

If the error thus calculated does not fall within an allowable target range, i.e., ±6% in this embodiment, then the transmittances and the radiuses of the annular portions outside of the effective pupil diameter $D_1$ on the filter are varied, and calculations are repeated again until the error comes within the allowable range. If the error falls within the allowable range, then varying the magnification by displacing the lens and the filter on the optical axis will be considered. When the magnification is varied, Dm is also varied. Therefore, a varied value of Dm is put into the above equation to determine $\Delta x$ to find the error. If the error thus determined falls within the allowable target range (+6%), then the process is finished. If the error falls outside of the allowable range, then the transmittance and the radius of the concentric circle within the effective pupil diameter are determined again, and then the transmittances in the respective positions are determined in the same manner as described above. The same procedure will be repeated until the error comes within the allowable range when producing an image of full size and when producing an image of varied size.

A filter which has annular portions of the radiuses and the transmittances thus determined is the filter 100 shown in FIG. 1 and defined by the foregoing table, i.e., the filter 100 which has its transmittance lowest around the projected effective pupil on the filter, and progressively higher through concentric levels toward the axially central portion of the filter 100 and toward the outer periphery thereof.

Figure 18:
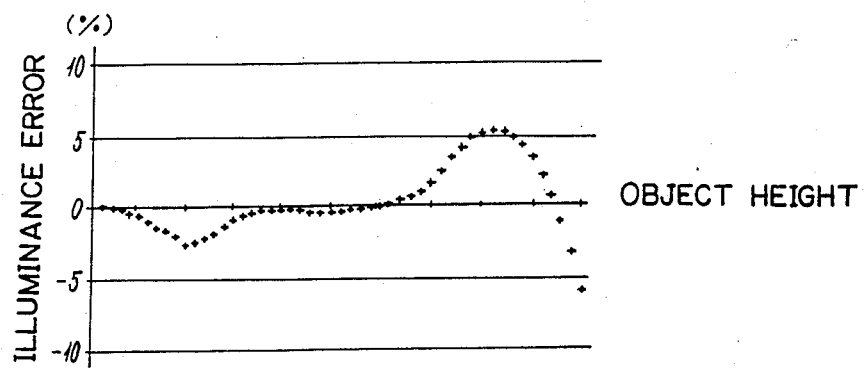
FIGS. 18, 19, and 20 are diagrams illuminance distribution errors when a lens is positioned for producing an image of full size, an image of enlarged size, and an image of reduced size, respectively, using the filter.
Figure 19:
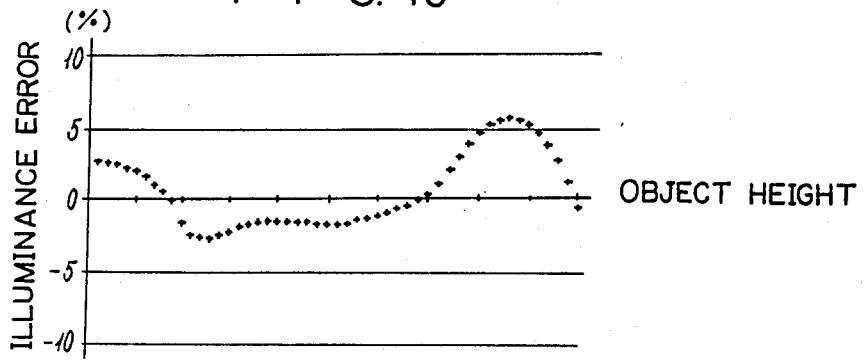
Figure 20:
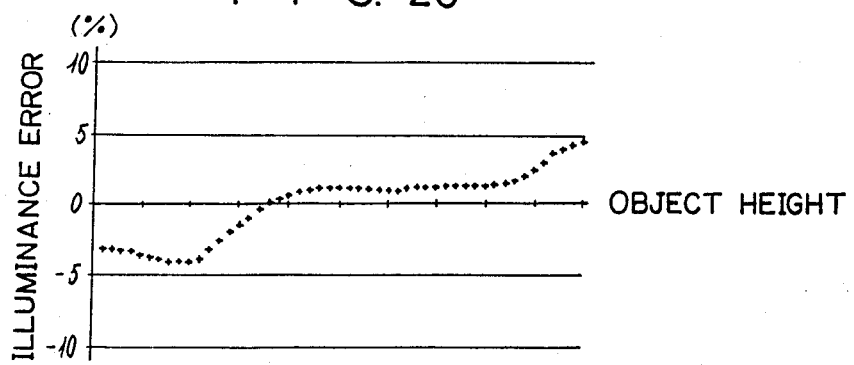

An experiment was conducted under the condition that the filter 100 was placed between the original 11 having the maximum height X and the lens with the distance between the entrance pupil 10 of the lens and the filter 100 being 52 mm, the original was uniformly illuminated, and the vignetting factor of the lens was 100%. As shown in FIG. 18, the illuminance errors in the respective positions when forming a full-size image were substantially within the allowable range of ±6%. When forming an enlarged image at the magnification of 1.414 or forming a reduced image at the magnification of 0.647, the errors were within the allowable range of ±6% though the error curves were different as shown in FIGS. 19 and 20. It was therefore confirmed that the transmissive filter of the present invention is much better than the conventional filters.

Figure 31:
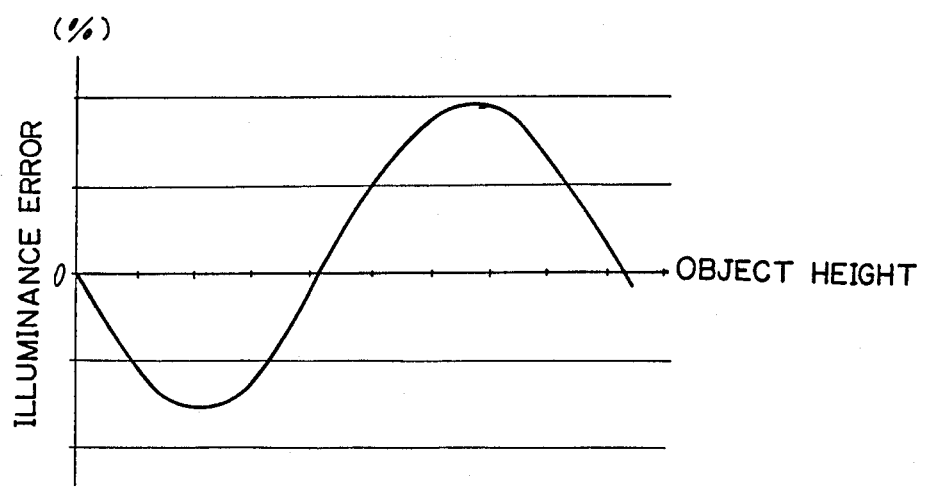
FIG. 31 is a diagram showing illuminance distribution errors dependent on object heights, using a conventional filter.

The axially central portion 1 is bright with the transmittance 100% unlike the conventional filters for the purpose of making the downwardly convex portion of the curve of FIG. 31 flat as much as possible. The annular portion 2 having an intermediate transmittance level is positioned between the annular portion 3 including the projected effective pupil and the axially central portion 1 for preventing an abrupt change in illuminance. The annular portion 4 is provided for making the upwardly convex portion of the curve of FIG. 31 flat as much as possible.

In the above embodiment, the filter is disposed between the original and the lens. However, the filter may be positioned between the lens and the image forming surface. In such an alternative, the effective pupil projected onto the filter is an exit pupil, not an entrance pupil.

Figure 21:
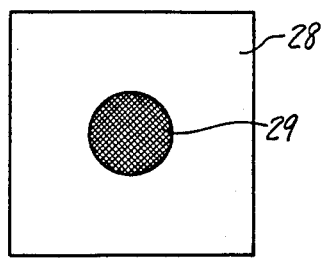
FIG. 21 is a view showing an enlarged dot for reducing an accumulative error.
Figure 22:
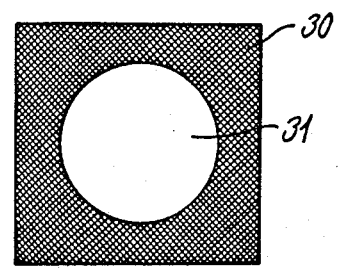
FIG. 22 is a view showing a blank dot.

In the above embodiment, nine opaque circles 35 may be positioned within the square unit 30 having vertical and horizontal sides 3a. The greater the number of opaque dots, the more errors are accumulated upon etching or evaporation, resulting in very high transmittance. For the transmittance of 91.18587% (annular portion 6), an opaque dot 29 (FIG. 21) having a greater diameter of 67 μm may be formed in a transparent square region 28 having vertical and horizontal sides of 200 μm by etching, or conversely a transparent dot having a greater diameter of 105 μm may be formed in an opaque square region 30 having vertical and horizontal sides of 200 μm by etching, to make the annular portion 3 with a minimized accumulative error.

Figure 23:
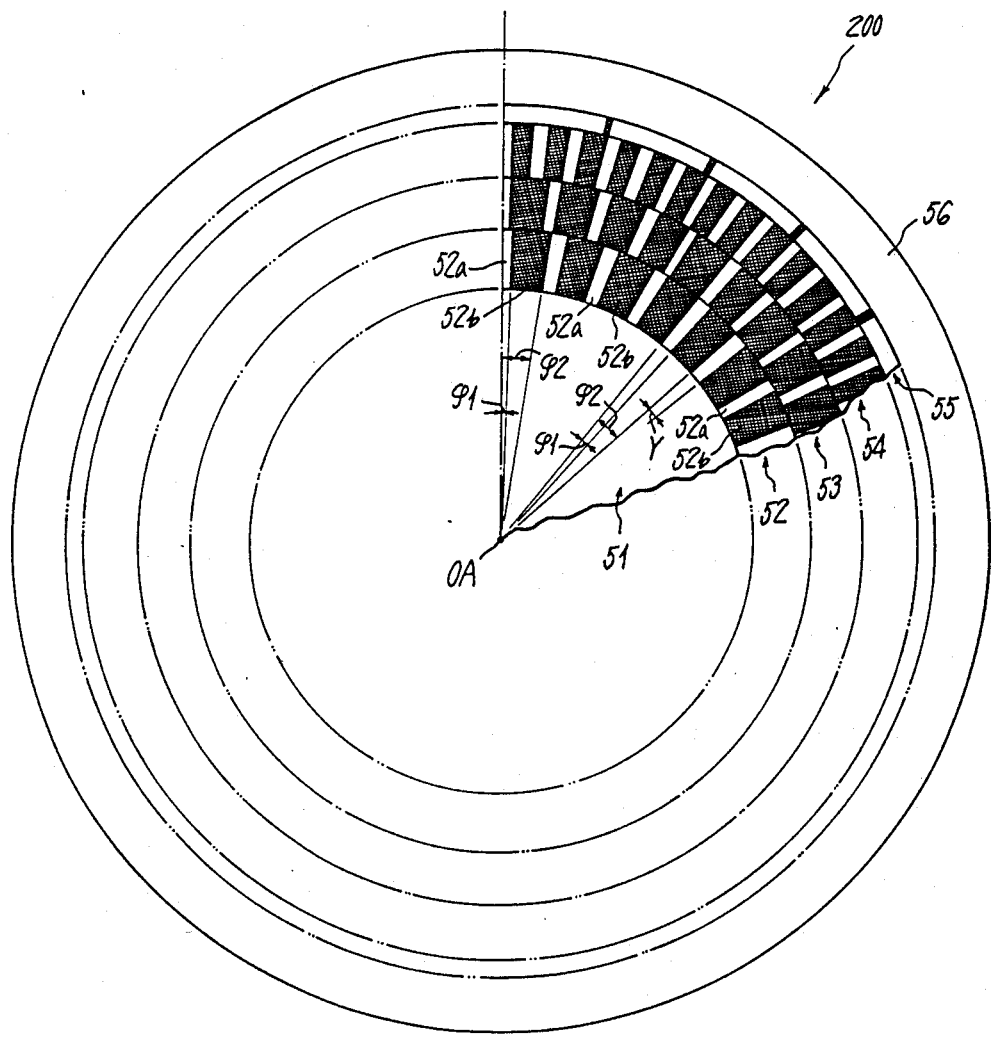
FIG. 23 is a fragmentary front elevational view of a transmissive filter for correcting illuminance distribution according to another embodiment of the present invention.

FIG. 23 fragmentarily shows in front elevation a transmissive filter 200 for correcting illuminance distribution according to another embodiment of the present invention. For making compact an image forming optical device incorporating the filter 200, the distance between the entrance pupil and the filter 200 is 50 mm, which is 2 mm shorter than that in the preceding embodiment.

The filter 200 of this embodiment differs from the filter 100 of the previous embodiment in that each of plural annular portions 52, 53, 54, 55, 56 has an integral number of substantially rectangular, radial elements. Each of the rectangular elements is divided into a transparent area and an opaque area by a dividing line passing through the axial center of the filter. For example, each of the rectangular elements of the annular portion 54 is divided into a white transparent area 52a and a black opaque area 52b.

In FIG. 23, only a portion of the filter 200 is shown as having rectangular elements for illustrative purpose. However, in reality, each of the annular portions 52 through 56 has transparent and opaque areas at illustrated intervals fully along the entire circumference thereof.

The rectangular elements in each of the annular portions of the filter 200 are divided as described above, and their opaque areas are masked to achieve a desired transmittance level. The transmittance is determined so as to be of a value produced by dividing a numerator angle, expressed in seconds, subtended by one transparent area by a denominator angle, expressed in seconds, subtended one rectangular element, i.e., by dividing an angle $\phi_1$ by an angle $\phi_2$ for the annular portion 52 in FIG. 23. A master disc for manufacturing such filters can easily be produced by a disc producing apparatus which can be intermittently rotated stepwise in seconds, e.g., a rotary encoder disc producing apparatus. Since such a disc producing apparatus can automatically be operated only in response to an input signal without requiring much manual labor, errors due to manual intervention as is the case with the conventional manufacturing process are produced, and the disc producing apparatus can operate highly accurately. The filter 200 of this embodiment can therefore be manufactured at a greatly reduced cost.

The rectangular elements in each annular portion are divided as described above. 360° is equal to 1296000″=360×60×60, which can be factorized into $2^7 \times 3^4 \times 5^3$. Therefore, at least the denominator for determining the transmittance, i.e., the factor per rectangular element must be $2^i \times 3^j \times 5^k$ (i=an integer of 0~7, j=an integer of 0~4, k=an integer of 0~3).

The etching process necessarily produces an error of about ±1 μm per rectangular element. In this embodiment, therefore, the minimum arc of a smaller one of transparent and opaque areas of each rectangular element, e.g., the length Y of an arc, closer to the center of the filter, of a transparent area 52a of the annular portion 52 is selected to be 25 μm or greater, so that any error produced upon etching will be ±4% or less.

A master disc for producing the transmissive filter 200 can inexpensively be fabricated by a rotary encoder disc producing apparatus, for example, with minimum error. The transmittances and the radiuses of the axially central portion 51 and the annular portions 52, 53, 54, 55, 56 are determined in the same manner as described above in the previous embodiment, and given in the following table:

| No. | Radius (mm) | Transmittance (%) |
| --- | --- | --- |
| 51 | 7.80 | 100 |
| 52 | 10.34 | 30.1944 |
| 53 | 16.60 | 21.4667 |
| 54 | 18.00 | 38.8667 |
| 55 | 19.00 | 91.2778 |
| 56 |  | 100 |

Since the distance between the entrance pupil and the filter 200 of this embodiment is 2 mm shorter than the distance in the preceding embodiment, as described above, the filter 200 does not have the annular portion 5 (transparent layer) of the filter 100. However, the radiuses and the transmittances of the annular portions remain substantially the same as those of the previous embodiment. Thus, the transmittance is lowest around the projected effective pupil on the filter 200, and progressively higher toward the axial center and also toward the outer periphery. The annular portion 52 having the transmittance of 30.1944% has 360 rectangular elements each subtending an angle of 3600″. Therefore, one transparent area subtends an angle of 1087″, and the minimum arc has a length of 41.105 μm which meets the aforesaid condition of being equal to or higher than 25 μm.

The annular portion 53 having the transmittance of 21.4667% has 432 rectangular elements each subtending an angle 3000″. Therefore, one transparent area subtends an angle of 644″, and the minimum arc is of a length of 32.315 μm which is larger than 25 μm. Likewise, the annular portions 54, 55 having the transmittances of 38.8667% and 91.2778%, respectively, have 864 and 240 rectangular elements, respectively. The minimum arcs are 46.92 μm and 41.1 μm, respectively, which are larger than 25 μm.

Figure 24:
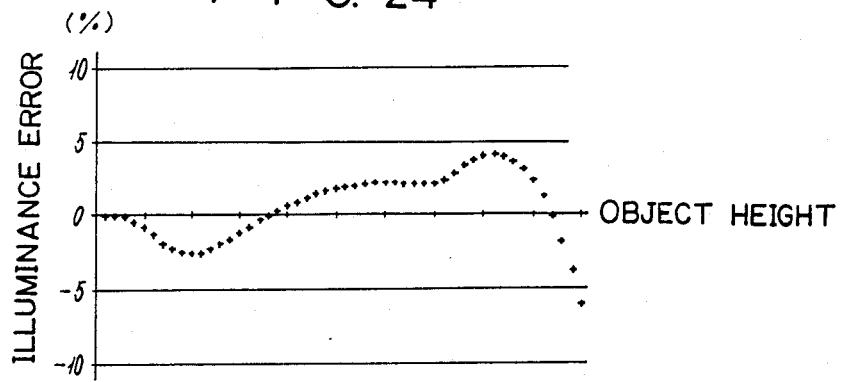
FIGS. 24, 25, and 26 are diagrams of illuminance distribution errors when a lens is positioned for producing an image of full size, an image of enlarged size, and an image of reduced size, respectively, with the filter of FIG. 23 disposed between an original image and the lens.
Figure 25:
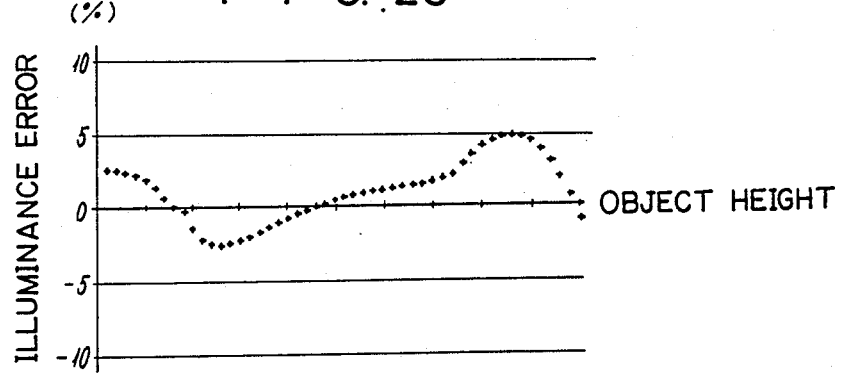
Figure 26:
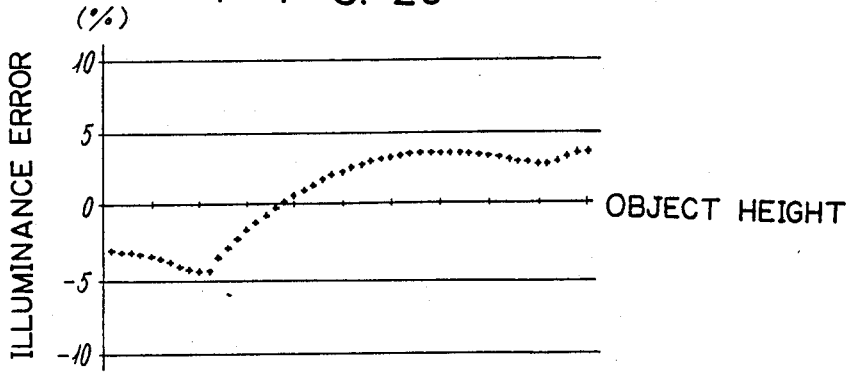

An experiment was conducted under the condition that the filter 200 was placed between the original and the lens with the distance between the entrance pupil of the lens and the filter 200 being 50 mm, the original was uniformly illuminated, and the vignetting factor of the lens was 100%. As shown in FIG. 24, the illuminance errors in the respective positions when forming a full-size image were substantially within the allowable range of ±6%. When forming an enlarged image at the magnification of 1.414 or forming a reduced image at the magnification of 0.647, the errors were within the allowable range of ±6% though the error curves were different as shown in FIGS. 25 and 26.

Figure 27:
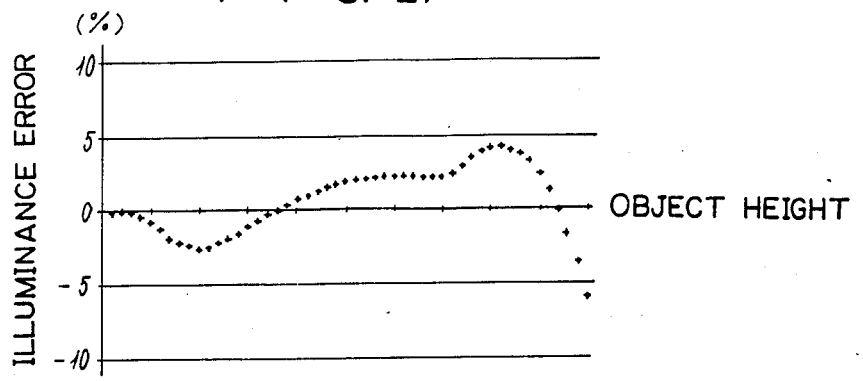
FIGS. 27, 28, and 29 are diagrams of illuminance distribution errors when a lens is positioned for producing an image of full size, an image of enlarged size, and an image of reduced size, respectively, with the filter of FIG. 23 disposed between the lens and an image forming surface.
Figure 28:
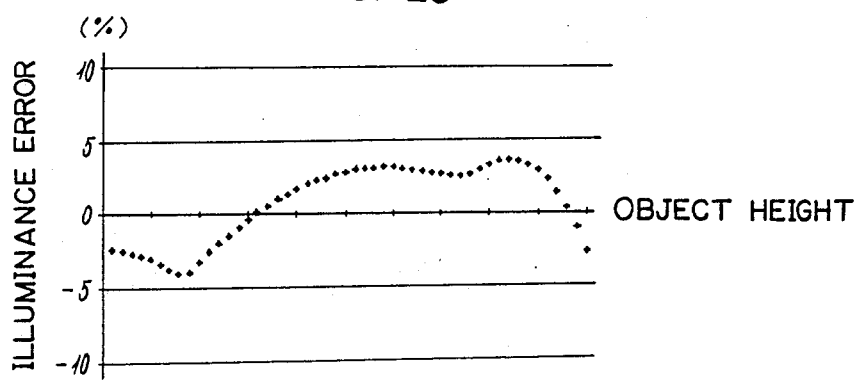
Figure 29:
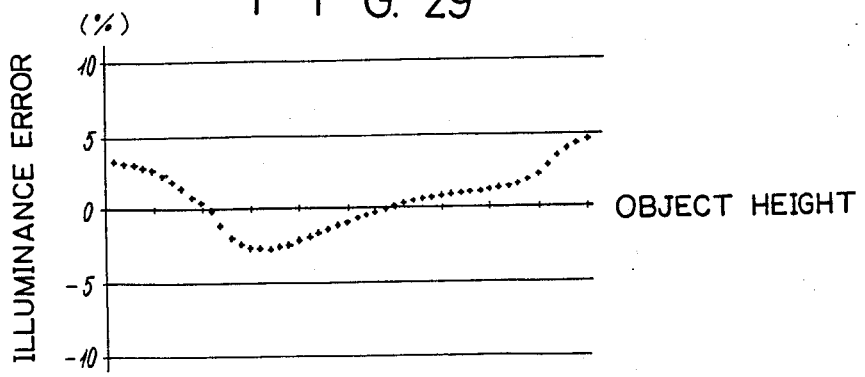

Another experiment was carried out in which the filter 200 was positioned between the lens and the image forming surface with the distance between the exit pupil and the filter 200 being 50 mm, and under the same conditions as in the above experiment. FIG. 27 shows illuminance errors at respective positions when forming a full-size image. The errors of FIG. 27 and their tendency are substantially the same as those of FIG. 24 in which the filter 200 was disposed between the original and the lens. The errors caused when forming an enlarged image at the magnification of 1.414 and a reduced image at the magnification of 0.647, shown in FIGS. 28 and 29, respectively, are within the allowable range, though their tendencies are different from each other. Therefore, it was confirmed that the filter of this embodiment can correct illuminance distribution much better than the conventional filters.

Figure 30:
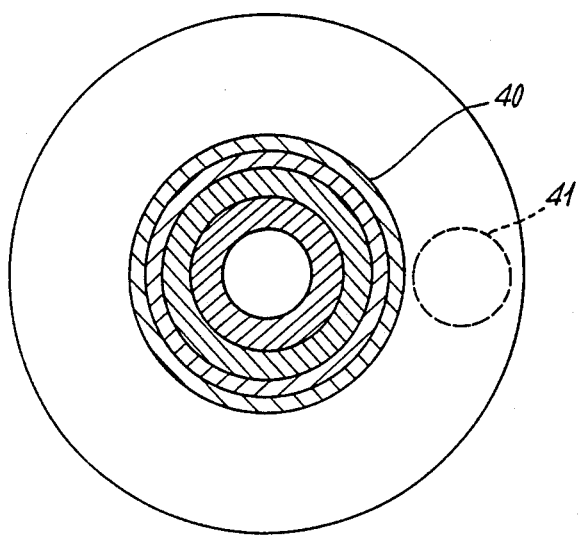
FIG. 30 is a view showing the positional relationship of a projected effective pupil on a filter at a maximum field angle.

As shown in FIG. 30, the filter according to each of the above embodiments is arranged such that it will not shield or block a projected effective pupil 41 (indicated by the dotted line) on the filter of the entrance or exit pupil at a maximum field angle, i.e., the projected effective pupil 41 is located in transparent portion outside of an outermost periphery 40 of the masked filter.

The transmissive filters 100, 200 are positioned in spaced relation to the lens so that any error or defect produced when the filters are manufactured can be corrected. However, if such an error or defect is negligible, then the lens and the filter may be integral with each other or located in intimate contact with each other.

In each of the above embodiments, a uniformly illuminating system is employed, and the vignetting factor of the lens is 100%. However, where an illuminating system having a desired illumination distribution is employed or the vignetting factor of the lens is not 100%, since it is known that the vignetting factor can be expressed as a function of the field angle $\theta$ (vignetting factor=$f(\theta)$), the term $\{(x/Lm)^2+1\}^2$ in the equation for finding $\Delta x$ may be multiplied by the field angle for the correction of illuminance distribution.

Although certain preferred embodiments have been shown and described, it should be understood that many changes and modifications may be made therein without departing from the scope of the appended claims.

What is claimed is:

1. A transmissive filter for correcting illuminance distribution, adapted to be positioned between a lens for forming an image of an illuminated original on an image forming surface and the image forming surface, or between said original and said image forming lens, and having transparent areas for passing light therethrough and opaque areas for blocking light, for correcting illuminance irregularities on said image forming surface, said transmissive filter having lowest transmittance around an effective pupil formed by projecting an exit pupil of said lens onto the filter when the filter is disposed between said lens and said image forming surface, or lowest transmittance around an effective pupil formed by projecting an entrance pupil of said lens onto the filter when the filter is disposed between said original and said lens, said transmittance being progressively higher concentrically in a stepwise manner toward an axial center and an outer periphery of the filter, said axial center of said filter being transparent.

2. A transmissive filter according to claim 1, wherein the projected effective pupil on the filter is not blocked at a maximum field angle.

3. A transmissive filter according to claim 1, wherein said transmittance is determined by the ratio of an area of opaque dots on a transparent base plate and an area of a transparent region on the transparent base plate.

4. A transmissive filter according to claim 1, wherein said transmittance is determined by the ratio of an area of an opaque region and an area of blank dots on the transparent base plate.

5. A transmissive filter according to claim 1, wherein said transmittance is determined by the ratio of an area of transparent region and an area of an opaque region in each of elements which are divided in a circumferential direction.

6. A transmissive filter according to claim 1, comprising a plurality of concentric annular portions each having an integral number of substantially rectangular, radial elements each divided into a transparent area and an opaque area by a dividing line passing through the axial center of the filter to provide the annular portions with respective transmittances.

7. A transmissive filter according to claim 6, wherein a minimum arc of a smaller one of the transparent and opaque areas of each rectangular element is of a length of at least 25 $\mu$m.

8. A transmissive filter according to claim 6, wherein said transmittance is of a value produced by dividing a numerator expressed in seconds by a denominator expressed in seconds, said denominator having a factor of $2^i \times 3^j \times 5^k$ (i=an integer of 0~7, j=an integer of 0~4, and k=an integer of 0~3).

* * * * *